(12) United States Patent
Patterson et al.

(10) Patent No.: US 7,224,270 B2
(45) Date of Patent: May 29, 2007

(54) CHILD SEAT AND MONITORING SYSTEM

(75) Inventors: James F. Patterson, Greentown, IN (US); Stuart S. Sullivan, Peru, IN (US); Rodney A. Lawrence, Frankfort, IN (US); Duane D. Fortune, Lebanon, IN (US); Edward J. Wallner, Westfield, IN (US); Stephen B. Porter, Noblesville, IN (US); William W. Fultz, Carmel, IN (US); Kevin D. Kincaid, Kokomo, IN (US); Gary R. Grieb, Lake Orion, MI (US); Jeffry N. Zolkower, West Bloomfield, MI (US)

(73) Assignee: Delphi Technologies, Inc., Troy, MI (US)

( * ) Notice: Subject to any disclaimer, the term of this patent is extended or adjusted under 35 U.S.C. 154(b) by 38 days.

(21) Appl. No.: 11/146,928

(22) Filed: Jun. 6, 2005

(65) Prior Publication Data

US 2006/0006713 A1 Jan. 12, 2006

Related U.S. Application Data

(60) Provisional application No. 60/607,988, filed on Sep. 8, 2004, provisional application No. 60/577,546, filed on Jun. 7, 2004.

(51) Int. Cl.
*B60Q 1/00* (2006.01)
(52) U.S. Cl. .................. 340/457.1; 340/665; 340/668; 280/801.1; 701/45
(58) Field of Classification Search ............... 340/665, 340/457.1, 668; 280/801.1; 701/45
See application file for complete search history.

(56) References Cited

U.S. PATENT DOCUMENTS

| | | | |
|---|---|---|---|
| 5,656,994 A | 8/1997 | Heninger | 340/457.1 |
| 5,711,574 A | 1/1998 | Barnes | 297/216.11 |
| 5,720,519 A | 2/1998 | Barnes | 297/216.11 |
| 5,965,827 A * | 10/1999 | Stanley et al. | 73/862.391 |
| 5,984,349 A | 11/1999 | Van Voorhies | |
| 6,151,540 A | 11/2000 | Anishetty | 701/45 |
| 6,246,936 B1 | 6/2001 | Murphy et al. | 701/45 |
| 6,272,936 B1 | 8/2001 | Oreper et al. | 73/862.621 |

(Continued)

OTHER PUBLICATIONS

Micronas, Mar. 2003, HAL 18xx, Low-Cost Programmable Linear Hall-Effect Sensor (2 pages).

*Primary Examiner*—Daryl C Pope
(74) *Attorney, Agent, or Firm*—Doug Fekete

(57) ABSTRACT

A child seat adapted for use in a vehicle, the child seat comprising: a shell portion; a harness for securing a child to the child seat, the harness comprising adjustable harness tether(s) secured to the shell portion at one end and having a latch plate at the other, the latch plate being configured to releasably engage a buckle of the harness; a tension sensor(s) for providing a signal indicative of a tension of the adjustable harness tether(s); and an electronic control unit secured to the shell portion, the electronic control unit being operably coupled to the tension sensor(s) to receive the signal, the electronic control unit being capable of processing the signal to compare the signal to a signal indicative of a predetermined range of acceptable tension, wherein the electronic control unit provides an output indicating whether the tension of the adjustable harness tether(s) is(are) within the predetermined range.

26 Claims, 12 Drawing Sheets

U.S. PATENT DOCUMENTS

| | | |
|---|---|---|
| 6,371,516 B1 | 4/2002 | Miyagawa ................... 280/735 |
| 6,382,667 B1 * | 5/2002 | Aoki .......................... 280/735 |
| 6,438,476 B1 | 8/2002 | Gray et al. ..................... 701/45 |
| 6,490,936 B1 | 12/2002 | Fortune et al. ......... 73/862.581 |
| 6,554,318 B2 | 4/2003 | Kohut et al. .............. 280/801.1 |
| 6,578,871 B2 | 6/2003 | Gray et al. ................. 280/735 |
| 6,587,770 B1 | 7/2003 | Gray et al. ..................... 701/45 |
| 6,595,545 B2 * | 7/2003 | Curtis et al. ................ 280/735 |
| 6,605,877 B1 | 8/2003 | Patterson et al. .......... 307/10.1 |
| 6,644,689 B2 | 11/2003 | Murphy ..................... 280/735 |
| 6,650,978 B1 | 11/2003 | Patterson et al. ............. 701/35 |
| 6,662,094 B2 | 12/2003 | Murphy et al. ............... 701/45 |
| 6,683,534 B2 | 1/2004 | Patterson et al. ........... 340/436 |
| 6,749,038 B2 | 6/2004 | Sullivan et al. ............. 180/268 |
| 6,796,192 B2 | 9/2004 | Sullivan et al. ........ 73/862.391 |
| 6,812,844 B1 | 11/2004 | Burgess .................... 340/573.1 |
| 6,818,842 B2 | 11/2004 | Gray et al. .................. 177/144 |
| 6,847,302 B2 | 1/2005 | Flanagan et al. ........... 340/666 |
| 6,850,825 B2 | 2/2005 | Murphy et al. ............... 701/45 |
| 6,851,503 B2 | 2/2005 | Almaraz et al. ............. 180/268 |
| 6,854,415 B2 | 2/2005 | Barnes et al. ............. 116/67 R |
| 6,863,286 B2 | 3/2005 | Eros et al. |
| 6,868,745 B2 | 3/2005 | Sullivan et al. ........ 73/862.391 |
| 6,889,146 B2 | 5/2005 | Sullivan et al. ............... 702/43 |
| 7,029,068 B2 | 4/2006 | Yoshida et al. |

\* cited by examiner

PARALLEL
CONFIGURATION

CENTER TAP
CONFIGURATION

SERIES
CONFIGURATION

CHILD SEAT AND MONITORING SYSTEM

CROSS REFERENCE TO RELATED APPLICATIONS

The application claims the benefit of U.S. Provisional application Ser. No. 60/577,546, filed Jun. 7, 2004, the contents of which are incorporated herein by reference thereto.

The application also claims the benefit of U.S. Provisional application Ser. No. 60/607,988, filed Sep. 8, 2004, the contents of which are incorporated herein by reference thereto.

This application is also related to the following United States Patent Applications filed contemporaneously herewith: CHILD SEAT AND MONITORING SYSTEM, PCT/US05/20050; CHILD SEAT MONITORING SYSTEM AND METHOD FOR DETERMINING A TYPE OF CHILD SEAT, PCT/US05/20046; CHILD RESTRAINT SYSTEM AND METHOD FOR MONITORING INSTALLATION OF THE CHILD RESTRAINT SYSTEM, PCT/US05/20041; CHILD RESTRAINT SYSTEM AND METHOD FOR MONITORING INSTALLATION OF THE CHILD RESTRAINT SYSTEM, PCT/US05/19872; CHILD RESTRAINT SYSTEM COMPRISING WEIGHT SENSOR, PCT/US05/20047; CHILD RESTRAINT SYSTEM COMPRISING CONTROL UNIT FOR EVALUATING HARNESS ADJUSTMENT, PCT/US05/20059. The contents of which are each incorporated herein by reference thereto.

TECHNICAL FIELD

This present invention relates generally to child seats and restraint systems. More specifically, the present invention relates to child seat with an apparatus for monitoring the state of a harness for securing a child to the child seat.

BACKGROUND

Usage of child and/or infant seats in vehicles has become commonplace and in some situations legally required. Many child seats are secured to the vehicle by passing the vehicle seat belt through an opening or openings in the child seat, wherein the child seat or infant seat further comprises a seat belt restraint system or harness for securing the child to the seat. Some child seats comprises an adjustable harness or restraint system comprising a pair of shoulder harness straps each having a tongue portion adapted to be secured to a buckle member. Thus, and in order to secure a child to a child seat the shoulder straps must be drawn about the child and secured to the buckle member. As is known in the related arts the restraint belts or system will be adjustable to allow the child seat to restrain children of different sizes as well as accommodate growth of the child. In addition, it is desirable to have the restraint system drawn about the child wherein the shoulder harness webbing of the restraint system is not too loose or too tight.

Accordingly, it is desirable to provide a child seat with an apparatus that will monitor and provide an indication of when the harness or restraint is secured about the child.

SUMMARY

Disclosed herein is a device and method for monitoring and providing an indication of when a harness of the child seat is properly secured about the child.

In accordance with an exemplary embodiment a child seat adapted for use in a vehicle is provided. The child seat comprising: a shell portion, configured either as a single entity, or with a base portion and a removable carrier portion which may be secured to the base portion; a harness for securing a child to the child seat, the harness comprising an adjustable harness tether secured to the shell portion at one end and having a latch plate at the other, the latch plate being configured to releasably engage a buckle of the harness; a tension sensor for providing a signal indicative of a tension of the adjustable harness tether; and an electronic control unit secured to the shell portion, the electronic control unit being operably coupled to the tension sensor to receive the signal, the electronic control unit being capable of processing the signal to compare the signal to a signal indicative of a predetermined range of acceptable tension, wherein the electronic control unit provides an output indicating whether the tension of the adjustable harness tether is within the predetermined range.

In another exemplary embodiment a child seat adapted for use in a vehicle is provided, the child seat comprising: a shell portion; a harness for securing a child to the child seat, the harness comprising an adjustable harness tether secured to the shell portion at one end and having a latch plate at the other, the latch plate being configured to releasably engage a buckle of the harness; a buckle engagement sensor for providing a signal indicative of the latch plate being engaged by the buckle; and an electronic control unit secured to the shell portion, the electronic control unit being operably coupled to the buckle engagement sensor to receive the signal, the electronic control unit being capable of processing the signal to compare the signal to a signal indicative of the latch plate being engaged by the buckle, wherein the electronic control unit provides an output indicating whether the latch plate of the adjustable harness tether is engaged by the buckle.

In another exemplary embodiment a child restraint system adapted for use in a vehicle is provided, the child restraint system comprising: a child seat having a shell portion; a harness for securing a child to the child seat, the harness comprising a pair of adjustable shoulder harness tethers each being secured to the shell portion at one end and each having a latch plate configured to releasably engage a buckle secured to the shell by a buckle tether, the buckle tether being secured to the buckle at one end and the shell at another end; a first tension sensor for providing a first signal indicative of a tension in the pair of adjustable shoulder harness tethers; and an electronic control unit secured to the child seat, the electronic control unit being operably coupled to the first tension sensor to receive the first signal, the electronic control unit being capable of processing the first signal to compare the first signal to a signal indicative of a predetermined range of acceptable tension in the pair of adjustable shoulder harness tethers, wherein the electronic control unit provides a first output indicating whether the tension of the pair of adjustable shoulder harness tethers is within the predetermined range.

In another exemplary embodiment a method for determining if the tension of an adjustable harness tether configured to secure a child to the child seat is within an acceptable range is provided, the method comprising: locating a tension sensor along a portion of the adjustable harness tether, wherein the tension sensor is configured to provide a signal indicative of a tension of the adjustable harness tether; receiving the signal of the tension sensor by an electronic control unit being operably coupled to the tension sensor and secured to a portion of the child seat; processing the signal to determine if the signal corresponds to a predetermined range of acceptable tension; and indicating whether the tension of the adjustable harness tether is within the predetermined range by providing an output.

In another exemplary embodiment a child seat adapted for use in a vehicle is provided, a child seat comprising: a base portion; a carrier portion configured to restrain a child to the carrier portion being removable secured to the base portion; a harness for securing a child to the carrier portion, the harness comprising a pair of adjustable shoulder harness tethers each being secured to the carrier portion at one end and each having a latch plate configured to releasably engage a buckle secured to the carrier by a buckle tether, the buckle tether being secured to the buckle at one end and the carrier at another end; a first tension sensor for providing a first signal indicative of a tension in the pair of adjustable shoulder harness tethers; an electronic control unit secured to the child seat, the electronic control unit being operably coupled to the first tension sensor to receive the first signal, the electronic control unit being capable of processing the first signal to compare the first signal to a signal indicative of a predetermined range of acceptable tension in the pair of adjustable shoulder harness tethers, wherein the electronic control unit provides a first output indicating whether the tension of the pair of adjustable shoulder harness tethers is within the predetermined range; a second tension sensor for providing a second signal indicative of a tension in the buckle tether, wherein the electronic control unit is also operably coupled to the second tension sensor to receive the second signal, the electronic control unit being capable of processing the second signal to compare the second signal to a signal indicative of a predetermined range of acceptable tension in the buckle tether, wherein the electronic control unit provides a second output indicating whether the tension of the buckle tether is within the predetermined range; and a buckle engagement sensor for providing a third signal indicative of whether the latch plates of the pair of adjustable shoulder harness tethers are engaged by the buckle and the electronic control unit is also operably coupled to the buckle engagement sensor to receive the third signal, wherein the electronic control unit is capable of processing the third signal to compare the third signal to a signal indicative of the latch plates of the pair of adjustable shoulder harness tethers being engaged by the buckle, wherein the electronic control unit provides a third output indicating whether the latch plate of pair of adjustable shoulder harness tethers are engaged by the buckle.

The above-described and other features of the present disclosure will be appreciated and understood by those skilled in the art from the following detailed description, drawings, and appended claims.

DRAWINGS

DESCRIPTION OF EXEMPLARY EMBODIMENTS

Disclosed herein is a method and apparatus for monitoring and providing an indication or state of a restraint system of a child seat, wherein the restrain system is configured to secure a child to the child seat. In accordance with an exemplary embodiment, the tension of the harness straps of the restraint system are provided to a control unit of the child seat wherein the control unit comprises an indicating means for providing a status of the harness strap tension. In another exemplary embodiment or in addition to the above embodiment a seat belt buckle sensor is provided wherein a signal indicative of a harness strap being secured to the seat belt buckle is provided to the control unit of the child seat wherein the control unit also comprises an indicating means for providing a status indicative of the securement of the harness strap to the harness buckle of the child seat.

Non-limiting examples of the indicating means includes visual displays comprising light outputs, visual displays comprising indicia, audible text, audible annunciators or tones and combinations of any of the foregoing.

The control unit can also be configured to receive signals from a plurality of sensors each being adapted to provide information relative to the child or infant seat to the control unit wherein the control unit will comprise an algorithm to interpret and provide an indication means relative to the sensor input.

Figure 1:
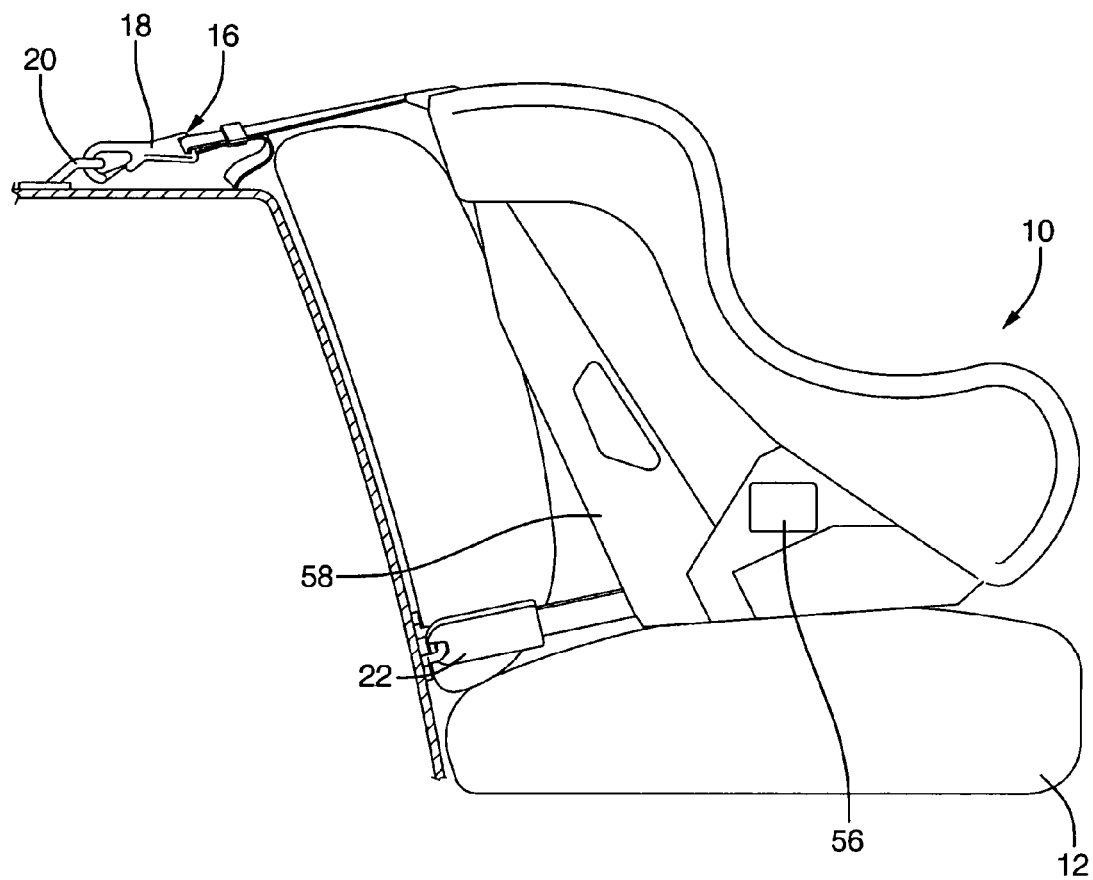
FIG. 1 is a side elevational view of a child seat constructed in accordance with an exemplary embodiment of the present invention.

Referring now to FIG. 1, a child seat 10 constructed in accordance with an exemplary embodiment of the present invention is illustrated. Child seat 10 is configured to be secured to a seat 12 of a vehicle (not shown) by at least one adjustable securement tether 14, which is fixedly secured to the child seat at one end and comprises a latching device 16 at the other. In accordance with an exemplary embodiment, latching device 16 comprises a hook or clasp 18 for securement to at least one universal anchor 20 disposed on or proximate to the vehicle seat. In accordance with an exemplary embodiment a lower portion of the child seat is equipped with a rigid anchor 22 while a top portion is equipped with a tether. Alternatively, rigid anchor 22 is replaced by another adjustable tether or a seat belt of the vehicle.

Figure 2:
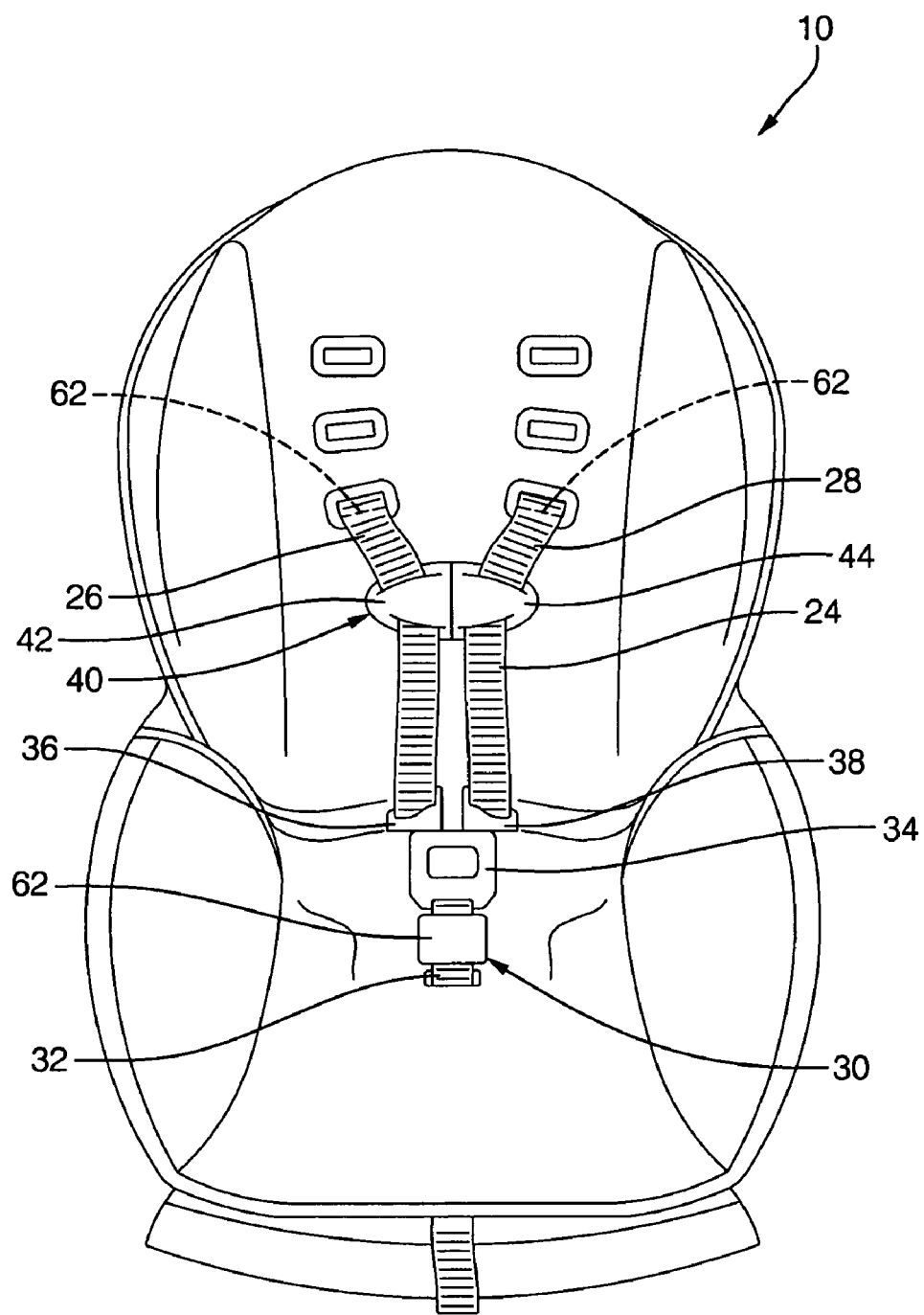
FIG. 2 is a front view of a child seat of the FIG. 1 embodiment.

Referring now to FIG. 2 a perspective view the child seat of FIG. 1 is provided, as illustrated, a child harness 24 is provided. Harness 24 comprises an adjustable left harness tether 26 and an adjustable right harness tether 28 each being securable to a buckle portion 30. Buckle portion 30 comprises a tether 32 mounted to the child seat at one end and a buckle 34, left harness tether 26 is securable to buckle portion 34 is via a clasping portion or latch plate 36 while right harness tether 28 is securable to buckle 34 via clasping portion or latch plate 38. In addition, a chest clasping portion 40 comprising a left chest clasping portion 42 and a right chest clasping portion 44 is positioned on each of the harness tethers in order to provide a point of securement at the child's chest. This system is known as a "five point harness".

Figure 3:
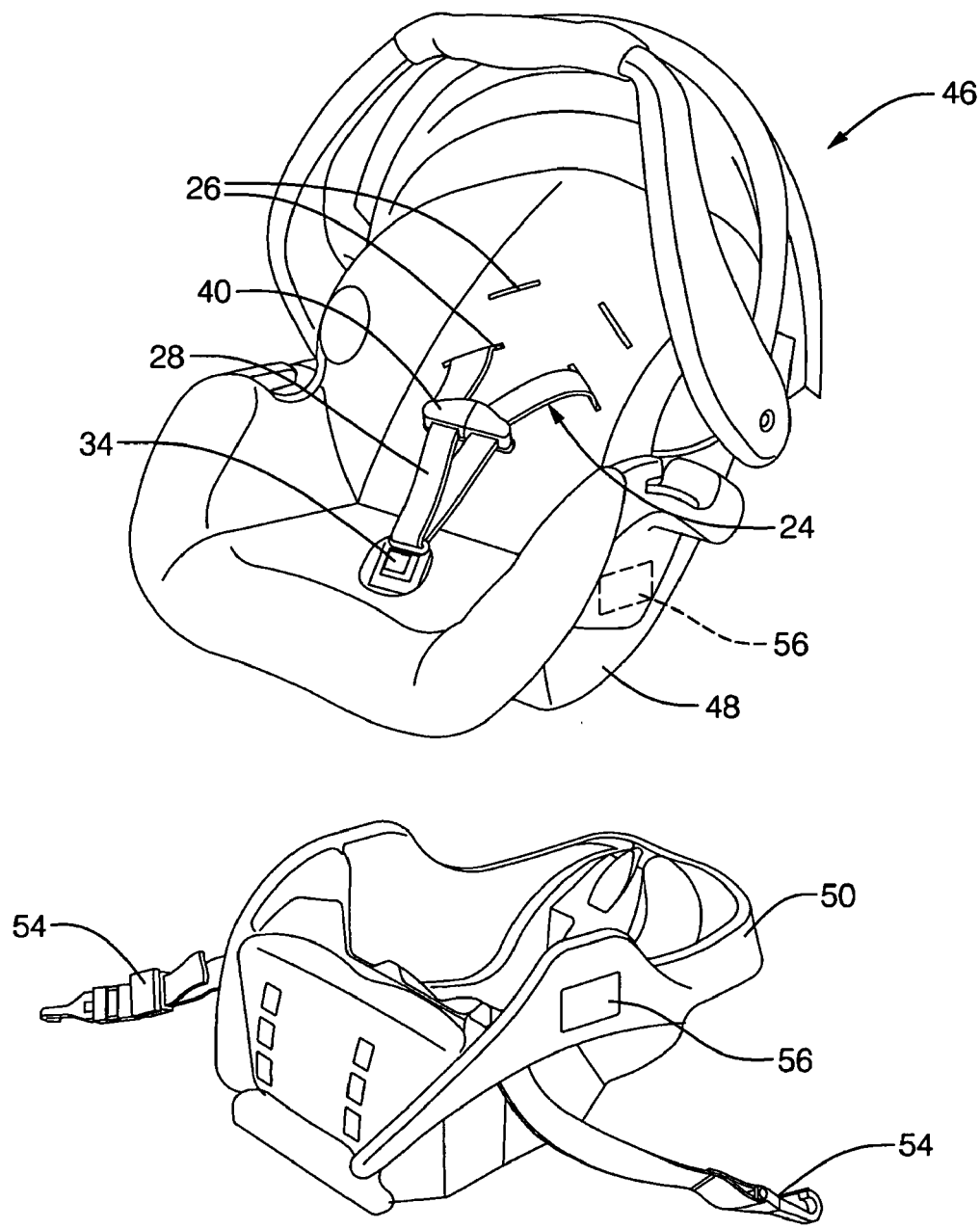
FIG. 3 is a perspective view another child seat constructed in accordance with an alternative exemplary embodiment of the present invention.
Figure 4:
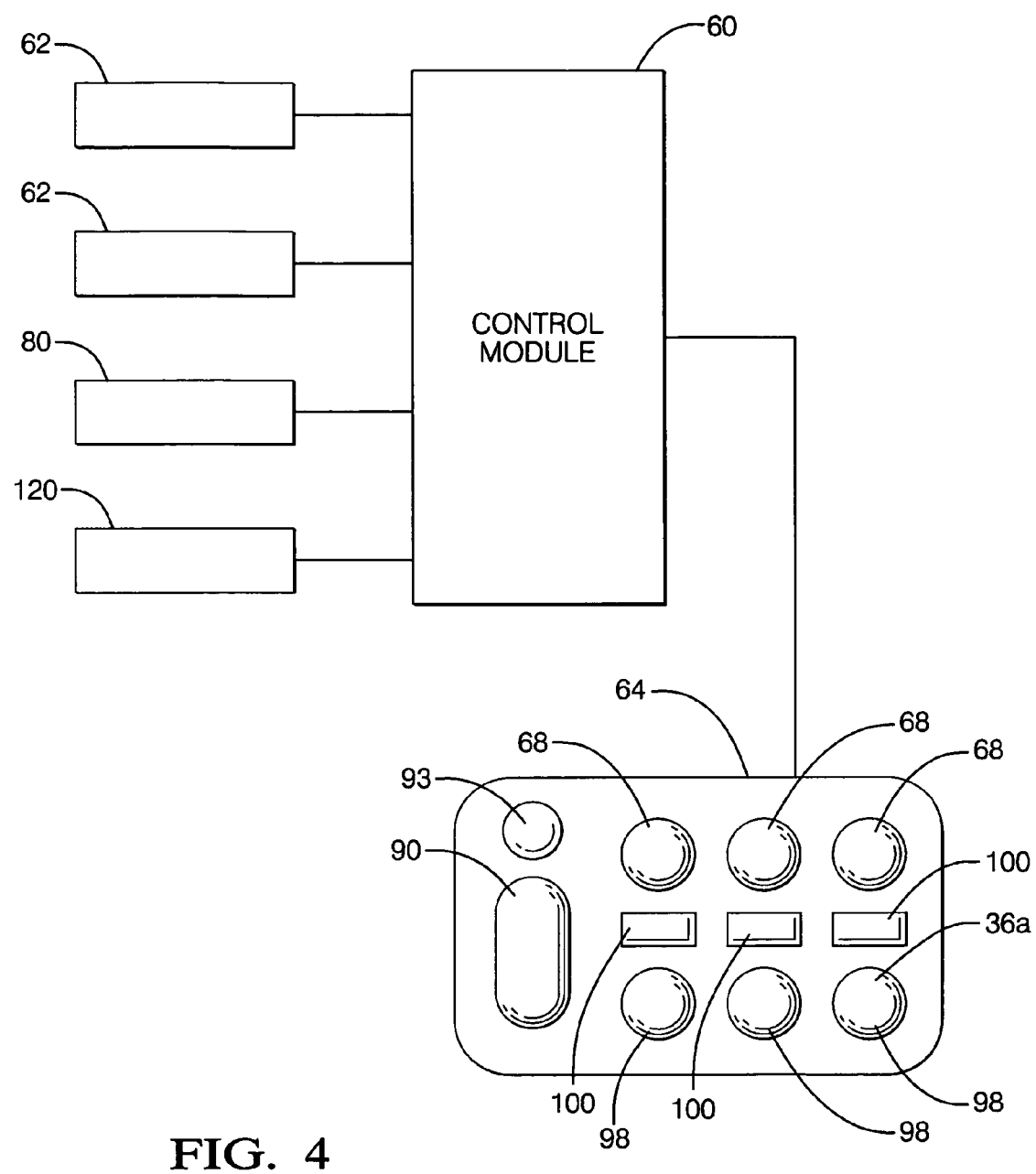
FIG. 4 is a schematic illustration of an electronic control unit constructed in accordance with an exemplary embodiment of the present invention.

Referring now to FIG. 3, a rear facing infant seat 46 is illustrated. Infant seat 46 comprises a carrier portion 48 removably secured to a base portion 50. Base portion 50 is fixedly secured to the vehicle seat by an adjustable tether 52 comprising a pair of clasping portions 54 disposed at either end of the adjustable tether for securement of the same to the vehicle via universal anchors 20. The base portion is intended to remain in the vehicle while the carrier portion is intended for transport of the child in vehicle as well as outside of the vehicle thereby allowing transport of the infant without waking him or her. Accordingly, carrier portion 48 securely couples to the base portion for transporting a child within the vehicle, but may be disengaged from base portion for carrying the child outside the vehicle. This infant seat is intended for infants from birth weight to weights of up to approximately 20-22 pounds or when the baby no longer fits within the carrier portion. Of course, it is understood that these ranges are provided as examples and the contemplated ranges may vary. Similar to the child seat of FIGS. 1 and 2 the infant seat will also comprise a harness for securing an infant to the infant seat. As illustrated, the harness of the infant seat is similar to the harness of the child seat.

Referring now to FIGS. 1-3 and in accordance with exemplary embodiments of the present invention each child seat (either infant or child) will be equipped with an electronic control unit 56. In accordance with an exemplary embodiment electronic control unit 56 is integral with a shell portion 58 of child seat 10 or base portion 50. Alternatively, electronic control unit 56 is configured to be inserted into a cavity of either the shell portion or base portion. In yet another alternative to electronic control unit may be installed on the carrier portion of the infant seat.

In accordance with an exemplary embodiment and referring now to FIGS. 1-4, the electronic control unit will comprise a microprocessor 60, microcontroller or other equivalent processing device capable of executing commands of computer readable data or program for executing a control algorithm that receives signals from a plurality of sensors 62 and provide an output to a display 64 via visual and/or audio drivers, wherein an indicator 68 of the electronic control unit is activated. In accordance with an exemplary embodiment, the electronic control unit is configured to have analog comparator circuitry for processing analog signals. In one embodiment analog comparator circuitry is provided as a stand-alone feature or in combination with other processing electronics.

In order to perform the prescribed functions and desired processing, as well as the computations therefore (e.g., the execution of fourier analysis algorithm(s), the control processes prescribed herein, and the like), the electronic control unit may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces. As described above, exemplary embodiments of the present invention can be implemented through computer-implemented processes and apparatuses for practicing those processes.

In one contemplated embodiment the electronic control unit is adapted to receive signals transmitted thereto, one non-limiting example would be wireless radio frequency RF transmission or direct electrical communication via a wiring.

In order to ensure proper securement of the child to the child seat via the harness it is desirable to have a minimum amount of tension in the harness straps when the child is secured in the seat. An exemplary range of acceptable tension is approximately 3-36 Newtons or approximately 0.7-8.0 pounds. Of course, it is understood that the aforementioned ranges are provided as non-limiting examples and these ranges may vary to be greater or less than the aforementioned ranges. In order to monitor this amount of tension a tension sensor 62 is positioned to detect the tension and provide a signal indicative of tension to the microprocessor. In accordance with an exemplary embodiment multiple sensors may be positioned in each of the tethers to provide signals to the electronic control unit. For example, the locations illustrated in the dashed lines of FIG. 2 other non-limiting locations of the tension sensor are shown in FIGS. 1-3 and FIG. 5. It is of course, understood that multiple or a single tension sensor may be utilized to provide harness tether tensions in accordance with exemplary embodiments of the present invention.

Figure 5:
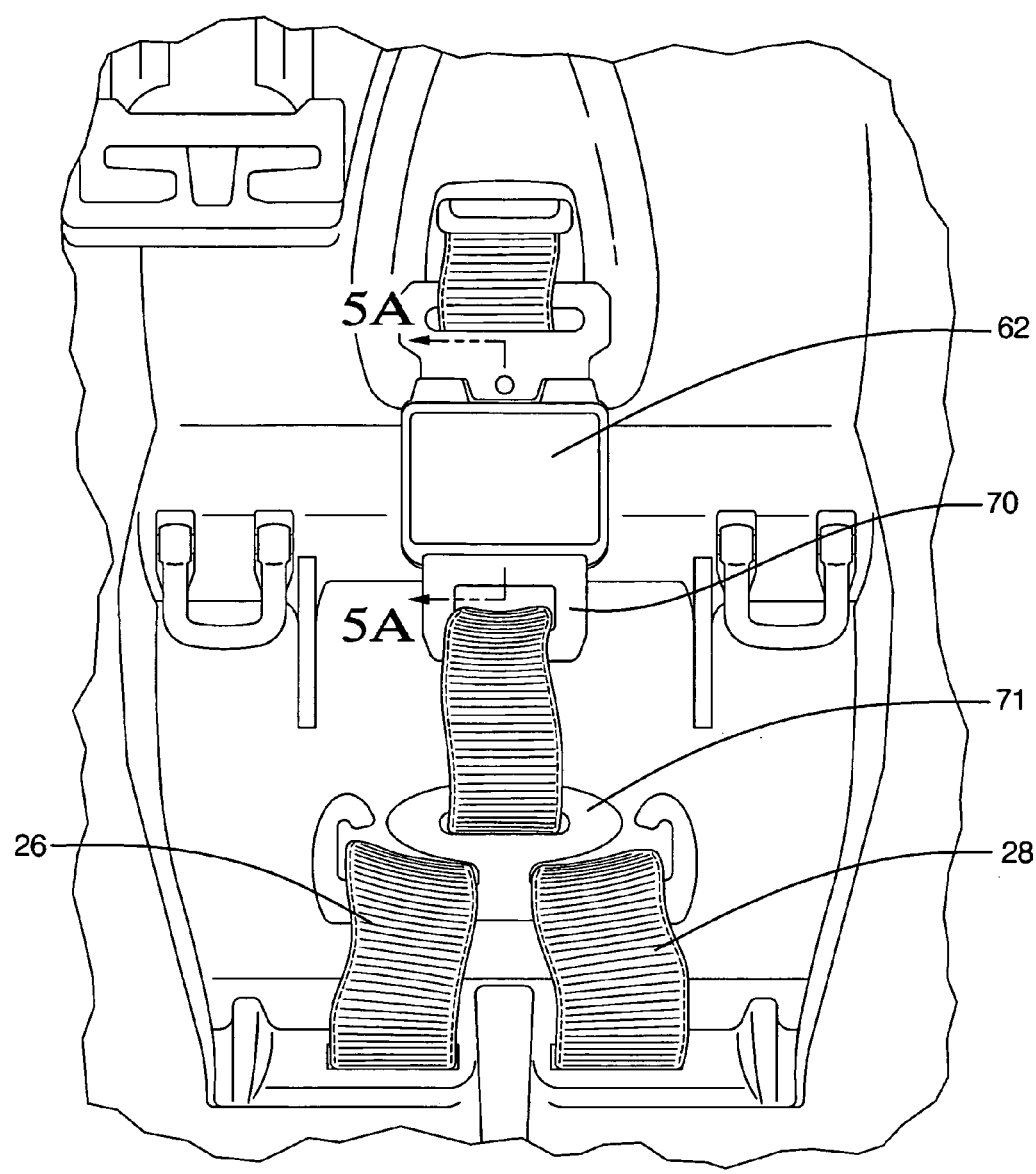
FIGS. 5 and 5A is view of a portion of a child restraint harness of the child seats illustrated in FIGS. 1-3.
Figure 5A:
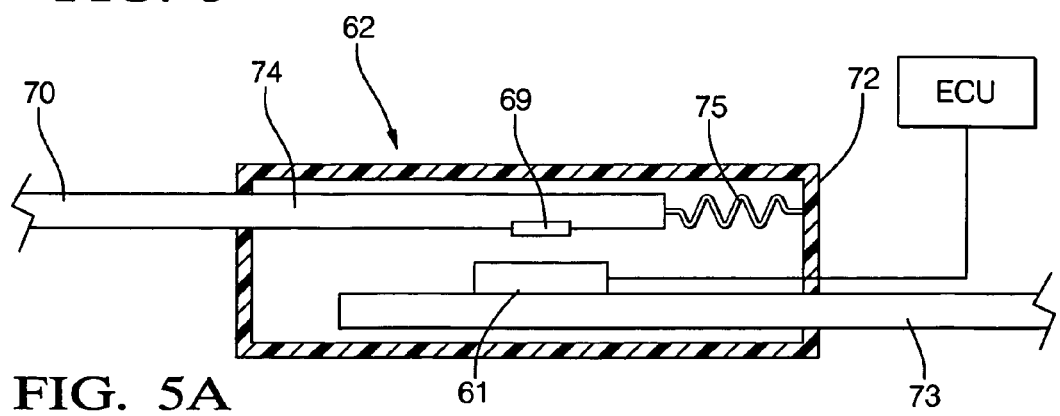
Figure 6A:
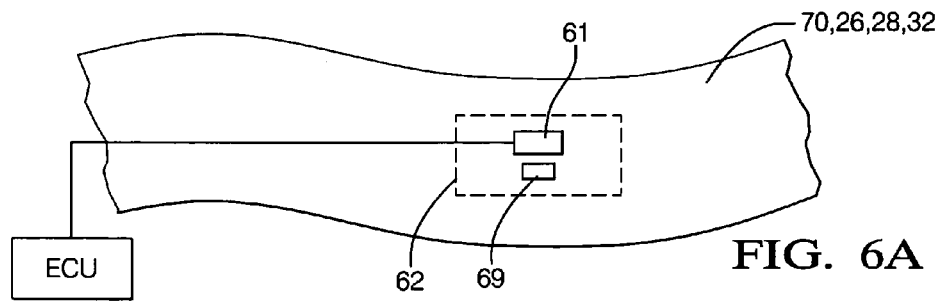
FIG. 6 is a schematic illustration of tension sensors contemplated for use with exemplary embodiments of the present invention.
Figure 6B:
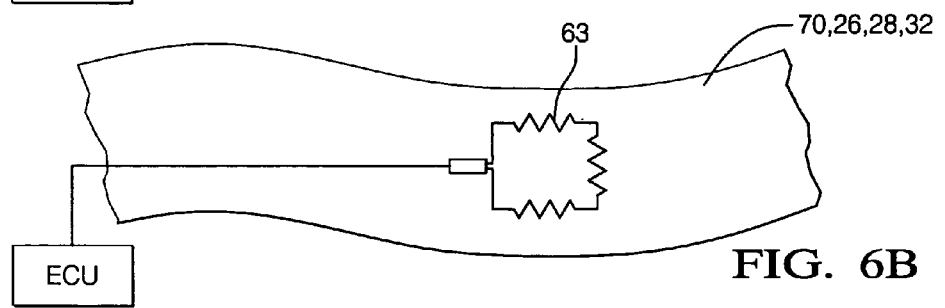
Figure 6C:
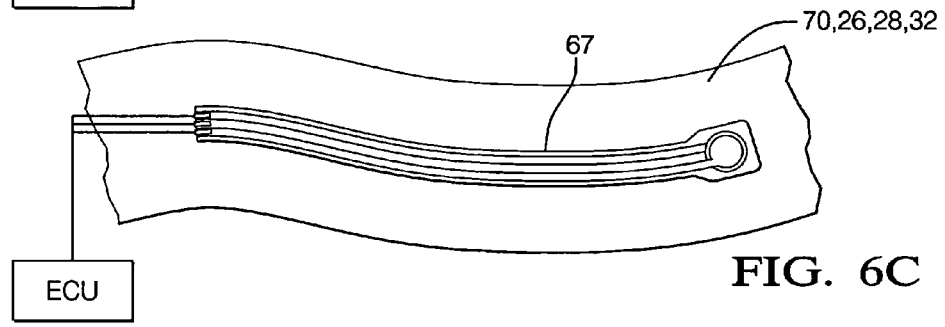
Figure 6D:
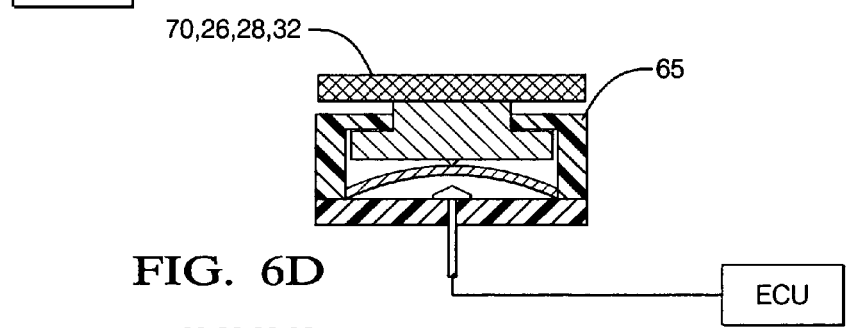
Figure 6E:
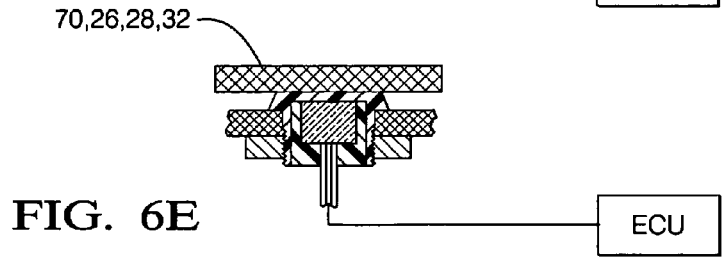

FIG. 5 shows a rear portion of either an infant seat or a child seat and the locations of the harness tethers as they are secured to the shell of the child seat. As illustrated in FIG. 5, the two harness tethers are secured to a single harness tether 70 via a yoke 71 wherein a single tension sensor 62 can be located to measure the tension on tether 70 corresponding to both of the harness tethers (26, 28) as opposed to separate signals from the left harness tether and the right harness tether. In a similar fashion a tension sensor 62 may be disposed between buckle 34 and its point of securement to the child seat (see for example, FIGS. 2 and 7).

By measuring the tension in the tether it is now possible to detect improper securement of the child to the child seat due to the harness tethers being twisted or misrouted through the wrong slots or apertures in the child seat shell portion; not being pulled taught enough or the clip(s) may be attached to the incorrect side of the buckle; and tensions that are too high thus uncomfortable to the child. By using a means to measure the tension of the harness tethers, the vehicle driver can be alerted that there is a problem with the child seat installation.

In accordance with an exemplary embodiment the monitoring device(s) or sensors are positioned at or about the attachment point of the adjustable tether to the child seat wherein the amount of tension on the tether(s) can be monitored. Alternatively, the tension may be monitored by placing the tension monitoring device(s) directly on or in-line with the tether(s) wherein the tether(s) tension may be monitored. In yet another alternative embodiment, the tension sensor may be embedded into the webbing of the adjustable tether.

Several technologies may be used to sense the adjustable tether(s) tension load. Referring now to FIG. 6 several sensor contemplated technologies are contemplated for use as a tension sensor; non-limiting examples include but are not limited to a spring-loaded Hall Effect sensor 61, a strain gage monitor 63, an electromechanical switch 65 and a force sensor 67. Examples of one such tension sensing assembly are found in U.S. Pat. No. 6,749,038 the contents of which are incorporated herein by reference thereto. Programmable ASIC applications of Hall Effect sensors are known in the art which process the resultant signal from the varying magnetic field and output a corresponding analog voltage or digital data value. One non-limiting example of such a sensor is the HAL 18XX family of sensors from Micronas, which is described in the cited document entitled: HAL 18XX, Low-Cost Programmable Linear Hall-Effect Sensor, the contents of which are incorporated herein by reference thereto.

One non-limiting example of such a sensing device is a magnetic member 69 disposed in the tether and a Hall effect sensor 61 positioned to sense the magnetic field of the magnet. Thus, when the magnet moves away the field changes and this is sensed by the sensor that provides an output signal. The Hall effect device will sense the strength of the magnetic field of the approaching magnet, and depending on the strength of the magnetic field, the Hall effect device will generate an electric signal (voltage or current), which can be used to determine the tension in the adjustable tether. In a non-limiting embodiment, the Vcc of the Hall effect sensor assembly is 5 volts +/−0.5 volts DC. The voltage with no magnetic field present will be approximately 2.5 v. As the magnet is brought into the proximity of the sensor, the voltage will increase to near Vcc or decrease to near ground, depending on the polarity of the magnet.

Accordingly, as the voltage increases or decreases, so does the tension of the seat belt. Thus, the sensor can be calibrated to detect acceptable tension ranges. Of course, Vcc may have values greater than and less than 5 volts.

Alternatively, the device can be configured such that the magnet moves further away from the Hall effect device when the movable member is moved and the reduction in the magnetic field will be sensed by the Hall effect device. In either embodiment, the signal is received by an algorithm of the electronic control unit.

In one non-limiting example, tension sensor 62 will comprise a housing 72 wherein a first portion 73 is secured to the child seat shell and a second portion 74 is movably anchored to the housing by a spring 75 at one end and the other end is secured to the harness tether wherein tension on the harness tether will cause movement of the second portion with respect to the first portion, wherein a magnet is disposed on the second portion and a Hall effect device is positioned on the first portion to detect movement of the magnet and provide a signal the electronic control unit. In one embodiment the spring constant can be calibrated to expand in accordance with acceptable tension ranges thus, upon application of a tension force in the acceptable range the spring will be overcome and the magnet will move away or closer to the Hall effect sensor. Non-limiting exemplary locations for housing 72 include but are not limited to being positioned between tether 70 and the child seat shell and/or between buckle 34 and buckle tether 32.

Although the use of a Hall effect device is described above it is also contemplated that other types of sensing devices may be used to sense movement and provide an output signal indicative thereof. For example, such alternatives include but are not limited to the following: magnetoresistor, magnetosensitive devices, anisotropic magnetoresistors, optical devices and equivalents thereof. Also, a magnetic flux deflector may be employed in lieu of a Hall effect device.

In embodiments wherein Hall effect devices are used the location of the magnets secured to the tether must be in close proximity to the Hall effect device so that movement can be detected.

Another exemplary sensing device could be an actuator manipulated by the tether or a sensor disposed directly on the tether. Another contemplated sensor is a Standard A201 sensor available from FlexiForce. Any such a sensor could be disposed in the locations illustrated schematically as item 62 in FIGS. 1-3 and 5. For example, spring 75 may be replaced by or be configured to include a strain gage (e.g., whetstone bridge) or force sensor to detect the force and thus the tension being applied to the harness tether.

Another alternative location for the sensor for detecting the harness tether tension would be the slots of the child seat. For example, a force sensor can be positioned at the point of contact between the left harness tether and the slot it passes through as well as the right harness tether and the slot that it passes through. In addition, a force sensor can also be positioned at the point of contact between the buckle tether and the slot that the buckle tether passes through. In this embodiment, the harness tethers are positioned to make contact with the force sensor positioned in the appropriate slot of the child seat where the applied force can be compared to an acceptable level of force, which will corresponding to an acceptable tension in the harness tethers. In addition, the tether may be coated with a coating at the point of contact to prevent wearing of the tether and allow for low frictional resistance between the tether and the force sensor to allow for sliding while detecting applied force. Additionally, the force readings from the harness tether slots and the buckle tether slots may each be used in an equation of the control algorithm in order to determine the harness tether tension. Alternatively, an actuator or Hall effect sensor arrangement may be disposed in the slots of the child seat.

In any of the aforementioned embodiments the sensor is configured to provide a signal to an electronic control unit, which comprises logic or is adapted to provide additional signals upon receipt of a signal indicating the tether has a tension within an acceptable range.

In each instance, the sensing principle is the same, only the sensing technology is changing. The sensor monitors the tension load exerted by the adjustable tether webbing through the selected path, and/or the tension force exerted to the tethers of the harness. The sensor(s) may be either analog or discrete. An analog sensor will continuously monitor the normal force exerted by the adjustable tether webbing or at the rigid anchor base. By monitoring the sensor output, a flag condition may be set when the tension load force correlating to an appropriate installation cinch force is met. A discrete sensor will be calibrated to toggle the output status when the appropriate tension load force condition is met.

The system controller will then input the signal into algorithm in order to determine if the received signal corresponds to a predetermined condition (e.g., tension or force on tether within an acceptable range), which would cause the controller to provide the indication means to the vehicle occupant. The algorithm may have a look up table of signals, which correspond to tensions and movements of the adjustable harness tether, which are compared to the signal received. The sensor communicates a signal electronically to the electronic control unit. The electronic control unit interprets the signal and processes it algorithmically to determine the tether status.

Figure 7:
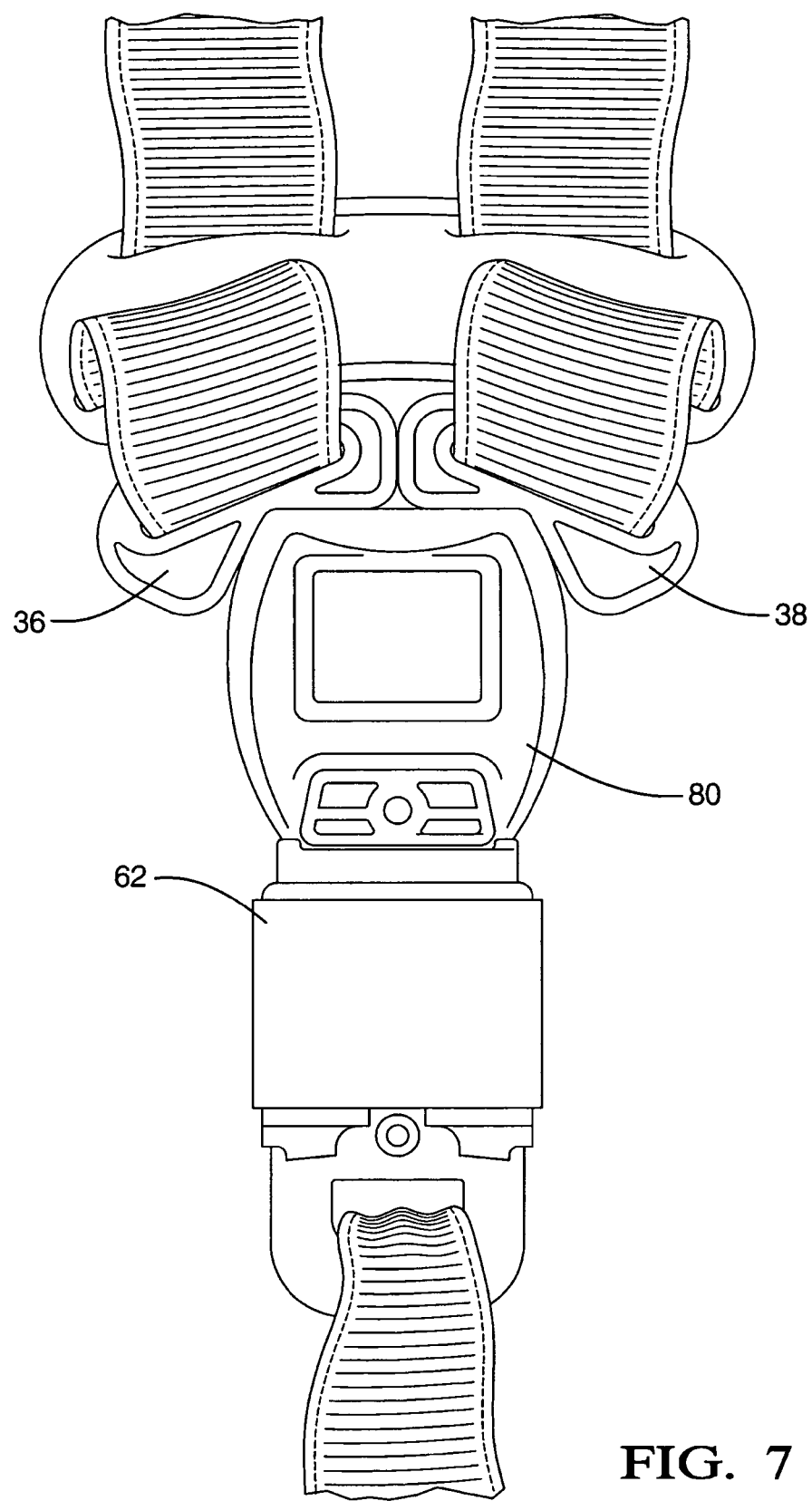
FIGS. 7-7F are schematic illustrations of buckle engagement detection sensors contemplated for use with exemplary embodiments of the present invention.

In accordance with an alternative exemplary embodiment the sensor signal may then be processed in the electronic control unit with other signals from a child seat for example and referring now to FIG. 7 an alternative exemplary embodiment is illustrated. Here a buckle switch sensor 80 is disposed within the buckle. Buckle switch sensor 80 with comprise electromechanical switches mounted in the buckle to detect the presence of the clasping portions or latch plates being inserted into the buckle switch.

Figure 7A:
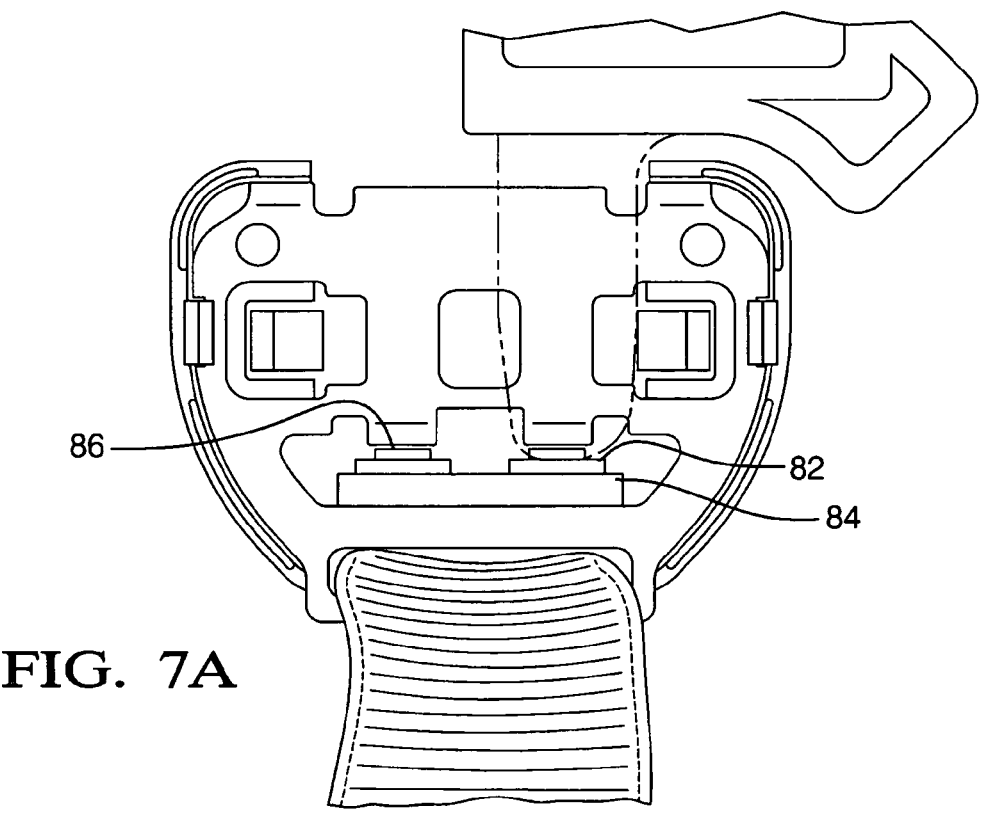
Figure 7B:
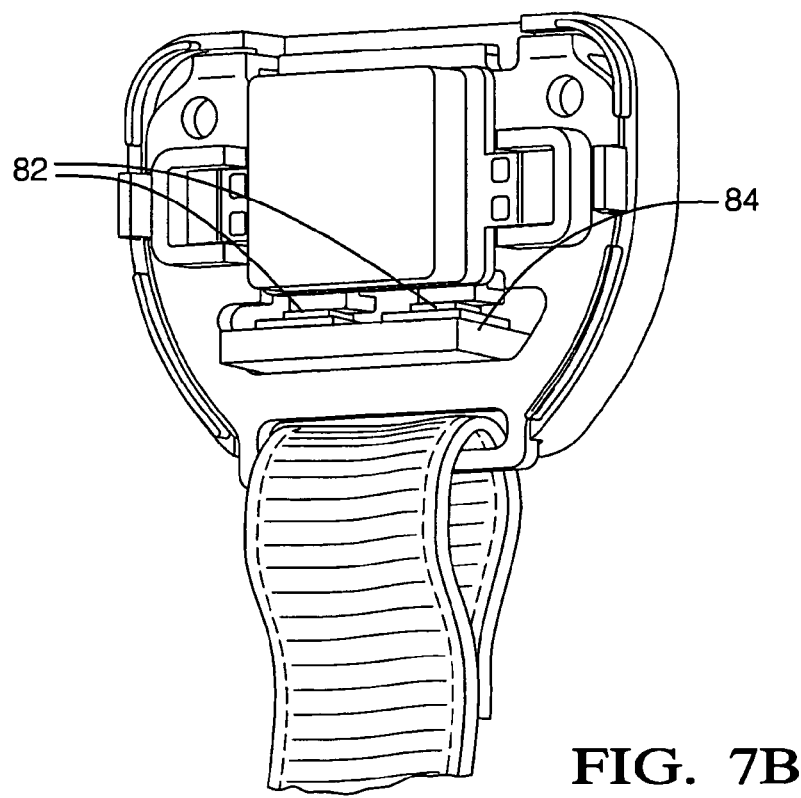
Figure 7C:
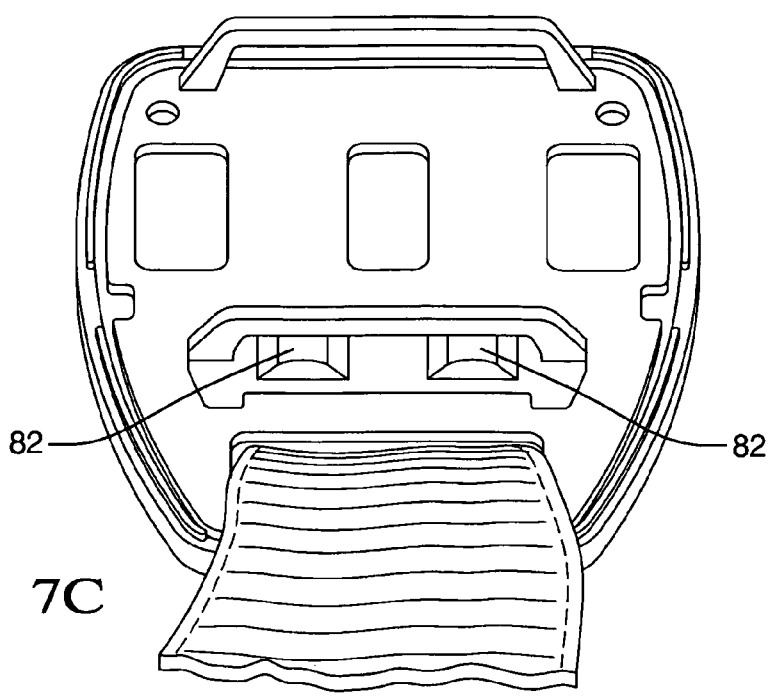
Figure 7D:
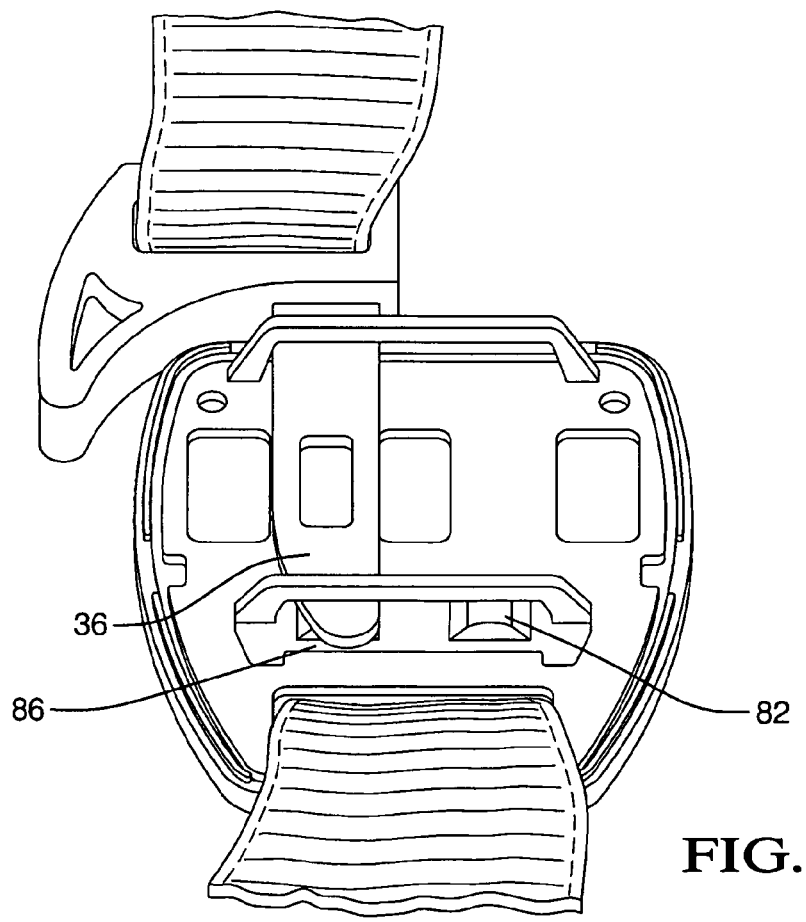
Figure 7E:
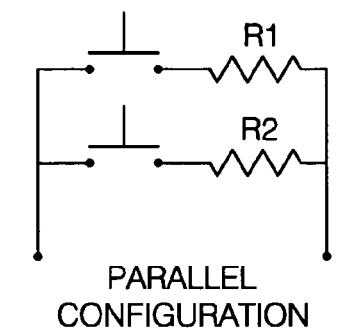
Figure 7E:
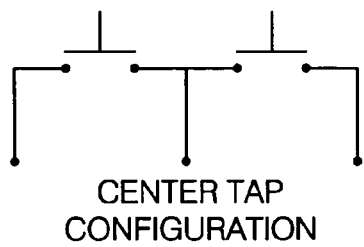
Figure 7E:
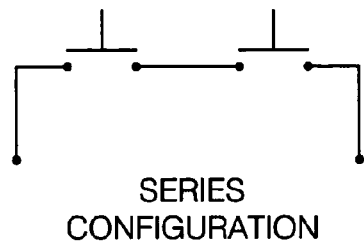

As illustrated in FIGS. 7-7E, electromechanical switches are positioned to detect the insertion of the latch plates or clasping portions of the harness tethers wherein two shoulder harness tethers are configured into a five-point harness with a free standing latch plate or clasping portion on each shoulder harness. During installation each latch plate or clasping portion is inserted into the buckle portion. It is, of course, understood that exemplary embodiments of the present invention may by configured for use with harness systems having a single latch plate.

In accordance with exemplary embodiments of the present invention multiple configurations of the electromechanical switches are contemplated for use with exemplary embodiments of the present invention. As illustrated in FIGS. 7A and 7B discrete miniature switches 82 are located on a printed circuit board 84 and are positioned to detect the presence of the clasping portion or latch plate of the harness tethers. In one non-limiting configuration a detection switch 82 (one for each clasping portion) is located at the end of travel of an end portion 86 of the clasping portion or latch plate such that upon full insertion of the clasping portion into the buckle, corresponding to a latched condition, the detection switch will be depressed and a signal indicative of a clasped harness tether is generated for receipt the electronic control unit. One example, as illustrated in FIGS. 7A and 7B is to locate the switch perpendicularly with respect to the end of the clasping portion such that the switch is depressed by the end of the clasping portion once it is inserted in the buckle. Alternatively and referring now to FIGS. 7C and 7D, the switch can be located in a parallel position with respect to the clasping portion such that the switch is depressed as the clasping portion slides by the switch.

Figure 7F:
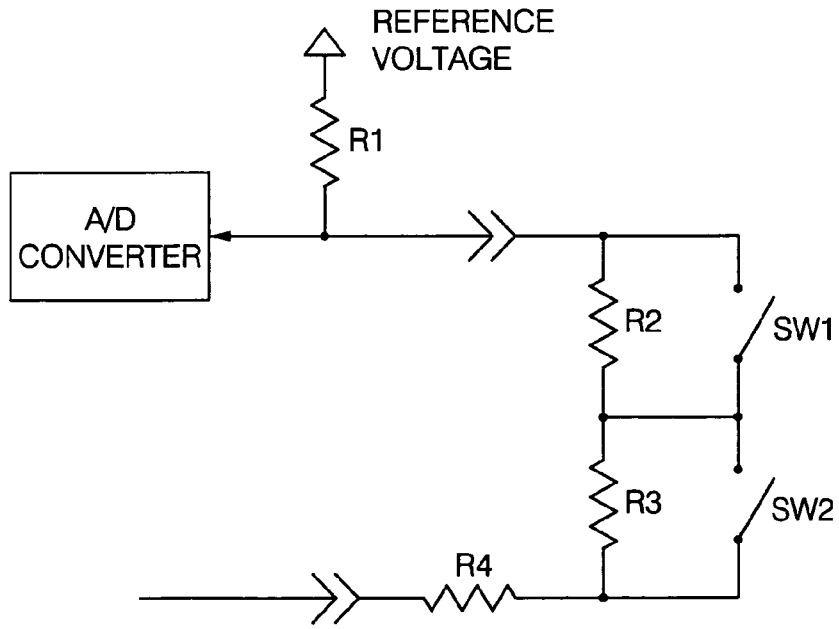

The switches can be wired in at least three different configurations as illustrated in FIG. 7E. The first configuration is where the switches are wired in series thus, both switches need to be actuated in order for the circuit to be closed, wherein a signal is provided to the electronic control unit indicating that both latch plates are secured to the buckle. The second configuration is where the switches are wired in series thus and the common (center tap) connection is provided to the electronic control unit wherein the control algorithm of the electronic control unit is able to differentiate one latch plate from the other. Thus, two separate signals may be provided to the electronic control unit (e.g., left harness buckled, right harness buckled). The third configuration is where the switches are wired in parallel and each switch has a different resistor value wired in series with the switch. This also allows the electronic control unit via the control algorithm to differentiate one latch plate from the other via the different signals received by the control unit. Thus, two separate signals may be provided to the electronic control unit (e.g., left harness buckled, right harness buckled) and based upon the signals received the electronic control unit can provide outputs indicative of harness securement (e.g., right harness secured, left harness unbuckled, etc.). In addition, and in an alternative embodiment and as a diagnostic feature, additional resistors are added to the wires communicating the signals to the electronic control unit, which will provide diagnostic capabilities. FIG. 7F illustrates a non-limiting example of such a circuit wherein additional resistors are provided and by appropriately selecting the ratio of resistors in this array, each switch can be diagnosed with a single tap monitor. For example, an open circuit in the wires leading to the switch array can be diagnosed correctly, rather than mistaken for an open switch configuration.

In some exemplary embodiments the buckle switch sensors will require power as well as communication of the signal to the electronic control unit. One contemplated method of signal transfer is through an RF transmitter located in the buckle housing wherein the transmitter is powered through a battery installed in an accessible battery compartment located in the buckle housing. Alternatively, the buckle switch sensors can be directly wired to the electronic control unit wherein power and signal transfer is facilitated.

In accordance with an exemplary embodiments the buckle switch sensor may provide signals along with the harness tether tension signals or alternatively in lieu of the harness tether tension sensor.

In accordance with another alternative exemplary embodiment the tension sensor signal and/or the buckle detection sensor signal may be processed in the electronic control unit with other signals from a child seat for example a signal from a sensor indicating whether a harness retainer clip or chest clasping portion 40 has been closed. Accordingly, the electronic control unit can determine the status of all the sensors and make an appropriate determination whether the child is secured properly in the child seat or not. The electronic control unit then can provide an output to the driver such as "Insufficient Harness Tension", "Harness Tension OK", or "Harness Sensor Faulted", "Harness Not Buckled", "Harness Incompletely Buckled", etc. as a result of performing internal electronic control unit and sensor diagnostics, such text read outs may be viewable on a liquid crystal display 90 of the display 64.

Each status indication can also be displayed as a series of LED/lights that are visible to the driver, or through a speech system, communicated by the electronic control unit, or alternatively communicated to the vehicle for display in the instrument panel as part of a display to the driver. In accordance with an exemplary embodiment a standalone sensing system with an internal power supply, such as a battery or kinetic device that derives its power from the motion of the vehicle is provided wherein the display is integral with the child seat. Alternatively, the system could plug into the 12V DC power of the vehicle.

Figure 8A:
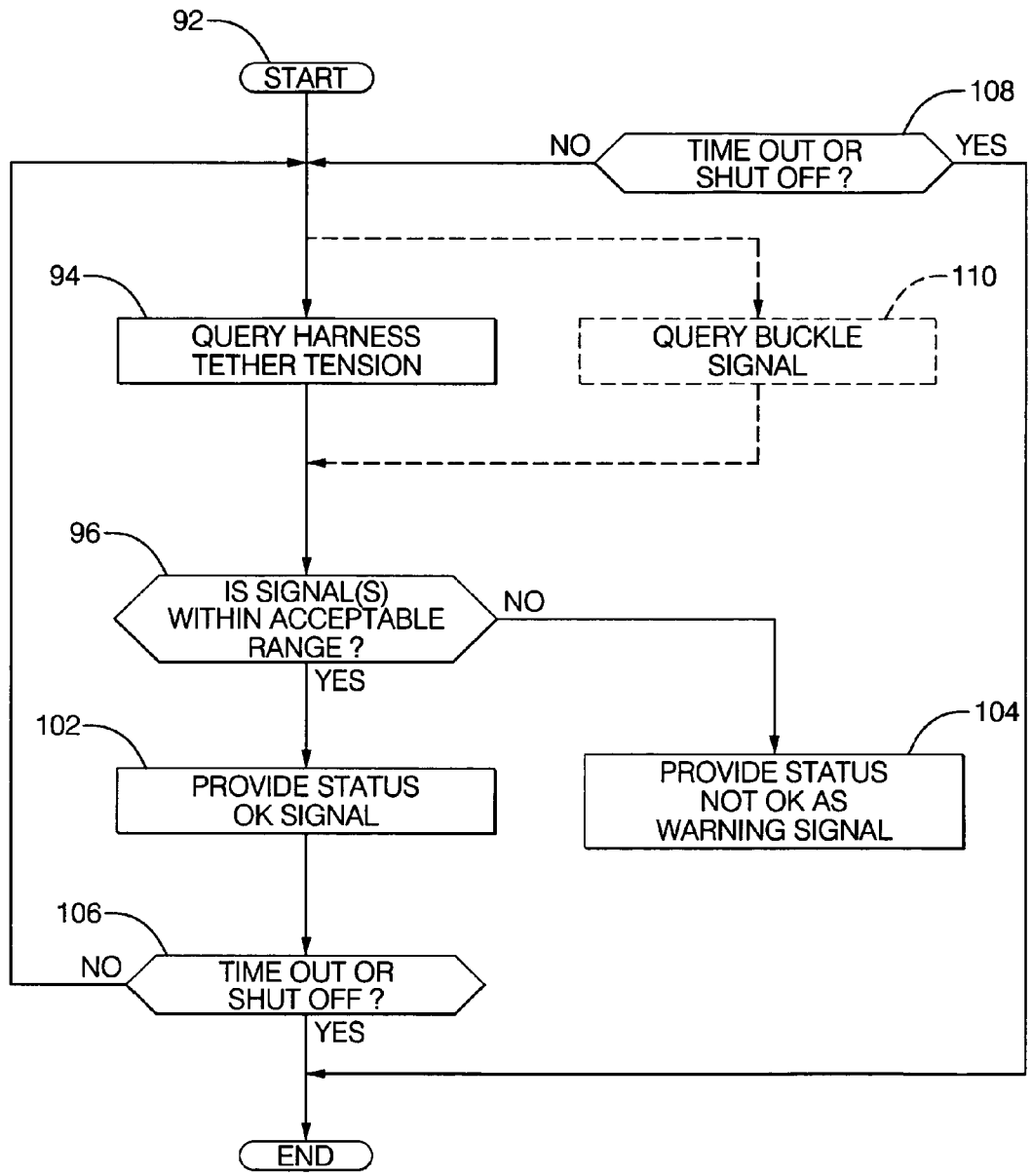
FIGS. 8A and 8B are flow charts illustrating portions of a control algorithm contemplated for use in exemplary embodiments of the present invention.

Referring now to FIG. 8A, a flow chart for portions of a control algorithm for determining the tension of at least one tether of a child seat is shown. At step 92, the electronic control unit initiates an evaluation of an adjustable harness tether tension. This may be in response to manipulation of an activation button 93 on the display or coupled to the electronic control unit. At step 94, the electronic control unit receives an output signal from the tension sensor, which as discussed above may be disposed on the rear portion of the child seat, at the buckle portion of the child seat or disposed within anyone of the harness tethers. As contemplated herein multiple signals indicative of the harness tension may be received or a single signal may be received. In the event of multiple signals the control algorithm will comprise look up tables for corresponding values of signals indicative of acceptable levels of tension. Furthermore, the algorithm may be configured to interpret or ignore values if for example one signal of a plurality of signals is the only one out of range, the system may be able to be configured to treat this as a false signal. At decision node 96 this iterative process takes place wherein the electronic control unit compares the sensor signal or signals to a signal value indicative of the predetermined tension limits (e.g., high and low) for the tether(s) associated with the tension sensor. In one exemplary embodiment, the output signal of the tension sensor is a voltage proportional to the tension of the tether and is compared to a voltage value corresponding to a signal that would be produced for an acceptable tension in the adjustable tether. Alternatively, a digital or binary output may be received.

In an exemplary embodiment, the electronic control unit is electrically coupled to the display that comprises the plurality of lights or LEDs 68, such as green lights, that confirm acceptable tension values in the adjustable tethers, and a plurality of lights or LEDs 98, such as red lights, that are illuminated in response to a signal indicating a tension outside of the predetermined range to provide a warning of an improper harness tether tension. In an non-limiting example the display will include indicia 100 identifying the tether wherein a green LED and red LED are positioned adjacent to each other to provide an indication of whether the adjustable tether is installed properly by having a predetermined amount of tension. Alternatively, a single LED capable of being illuminated in different colors is provided.

Accordingly, and if the signals in the acceptable range, the electronic control unit outputs an electrical signal to illuminate the green LED or provide "status ok" signal at step 102. Alternatively, and if the signal is not within the acceptable range the electronic control unit outputs an electrical signal to illuminate the red LED or "status not ok" at step 104, wherein the red LED is indicative of improper installation and the green LED is indicative of a proper installation. Thereafter, nodes 106 and 108 will query if a stop command should be issued, which may correspond to an expiration of a time period or the system being shut down manually.

Alternative methods for providing indication of the tension in the adjustable harness tether include but are not limited to an audible annunciators, and buzzers for providing an indication of an improper installation, or audible text or a visual display with indicia. A non-limiting example of a visual display is a liquid crystal display (LCD).

In accordance with an alternative exemplary embodiment, the signal from the harness buckle sensors is received by the control algorithm of the electronic control unit represented by box 110, as discussed above the buckle switch sensor may provide signals along with the harness tether tension signals or alternatively in lieu of the harness tether tension sensor. Similar to the logic of the tension signals the signal of the buckle sensor is processed at decision node 96 wherein the electronic control unit compares the sensor signal or signals to a signal value indicative of either the latch plates being engaged in the buckle or not. In one exemplary embodiment, the output signal of the latch plate sensor is a voltage signal and is compared to a voltage value corresponding to a signal that would be produced for a latched or unlatched condition. Alternatively, a digital or binary output may be received.

As discussed herein, the electronic control unit is electrically coupled to the display that comprises the plurality of lights or LEDs 68, such as green lights, that confirm latched conditions and a plurality of lights or LEDs 98, such as red lights, that are illuminated in response to a signal indicating an unlatched conditioned to provide a warning indicating an unsecured harness. In a non-limiting example the display will include indicia 100 identifying the tether, wherein a green LED and red LED are positioned adjacent to each other to provide an indication of whether the harness is latched to the buckle. Alternatively, a single LED capable of being illuminated in different colors is provided.

Accordingly, and if the appropriate signals are received; the electronic control unit outputs an electrical signal to illuminate the green LED or provide "status ok" signal at step 102. Alternatively, and if the signal is not within the acceptable range the electronic control unit outputs an electrical signal to illuminate the red LED or "status not ok" at step 104, wherein the red LED is indicative of improper installation and the green LED is indicative of a proper installation. Thereafter, nodes 106 and 108 will query if a stop command should be issued, which may correspond to an expiration of a time period or the system being shut down manually.

Alternative methods for providing indication of whether the harness is not secured to the buckle include but are not limited to an audible annunciator for providing an indication of an improper installation, or audible text or a visual display with indicia. A non-limiting example of a visual display is a liquid crystal display (LCD).

Figure 8B:
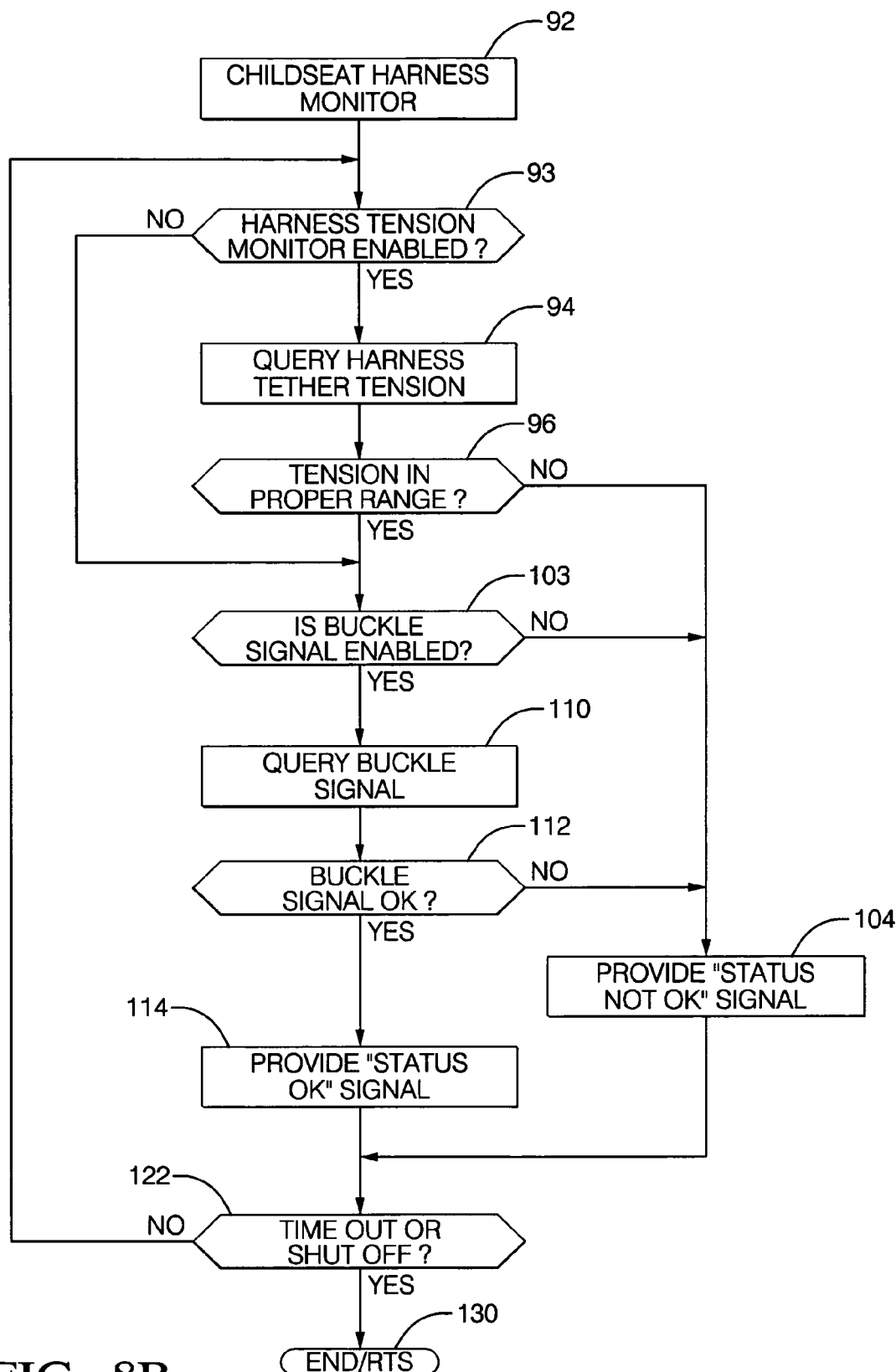

In yet another alternate embodiment the signals of both the harness tethers and the buckle switches may be combined into a single electronic control unit wherein some of the LEDs correspond to harness tether tension and others correspond to latch plate engagement. An illustration of a flow chart of a contemplated algorithm is illustrated in FIG. 8B wherein additional decision nodes 93 and 103 are added for determining if the harness tension monitor and the buckle signal have been enabled. In this embodiment, the "Status Ok" (box 114) will be provided when the ECU receives an acceptable signal from buckle sensor and if the harness tension monitor is enabled the ECU must also receive an acceptable harness tension signal at step 96.

Accordingly, exemplary embodiments of the present invention provide a child seat with an electronic control unit that determines the tension of the harness tether and/or latch plate engagement and illuminates an indicator light, which is located on the child seat in a location that would be easily viewed by the operator and/or occupants of the vehicle, wherein the indicator light provides a means for determining whether the harness tether is properly installed. For example, one such location of the indicator light is on the face of the control unit display. In addition, the microcontroller may also provide an audible tone or voice response, indicating whether the appropriate tension exists in the tether and/or the latch plate is not engaged. In addition, exemplary embodiments of the present invention are contemplated for use with various forward facing child seats as well as rear-facing infant seats including those with detectable carriers.

In addition, and in accordance with alternative exemplary embodiments the electronic control unit can also be configured to provide indications of other conditions relating to the child seat and/or its installation. In this embodiment, the child seat will comprise an electronic control unit secured to the child seat, the electronic control unit being operably coupled to the tension sensors and the latch plate engagement sensors to receive the generated signals and the electronic control unit is also operably coupled to a plurality of other sensors 120 each providing additional signals indicative of states of the child seat to the electronic control unit and the electronic control unit is capable of processing the additional signals to compare the additional signals to acceptable values, wherein the electronic control unit provides additional outputs indicating whether the additional signals are at acceptable values and the additional outputs are provided to additional LEDs disposed on the display. Of course, other methods of display are also contemplated for use in this embodiment.

Examples of such additional such parameters being monitored by the additional sensors include but are not limited to: monitoring adjustable mounting tether tension; perform infant seat weight classification; monitoring infant seat-to-base interlock state; monitoring infant seat angle and seat orientation; monitoring infant seat for exposure to severe impact or vehicle crash; monitoring rear facing infant seat base for contact with vehicle seatbelt; monitoring rear facing infant seat base for tension of vehicle seatbelt or lower tether; monitoring chest retainer clip for proper engagement; monitoring chest retainer clip for proper vertical height on the harness; monitoring shoulder harness slots for proper adjustment wherein audible and/or visual indications or warnings are provided to alert an individual if there is non-compliance with any of the monitored states.

In each instance, the sensors are electrically coupled to the electronic control module wherein the electronic control module provides an electrical signal indicative of the property being sensed. The electronic control module will determine, using a look-up table or suitable algorithm, a desired value for the sensed property, which desired value may be based upon the tension of the tether as determined by the tension sensor and if necessary, the control module provides an alert signal. For the display shown herein and in accordance with an exemplary embodiment, the alert signal illuminates a green light when the sensed property is within a desired range, and a red light is illuminated when the sensed property is not within the desired range.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A child seat adapted for use in a vehicle, the child seat comprising:
   a shell portion;
   a harness for securing a child to the child seat, the harness comprising an adjustable harness tether secured to the shell portion at one end and having a latch plate at the other, the latch plate being configured to releasably engage a buckle of the harness;
   a tension sensor for providing a signal indicative of a tension of the adjustable harness tether; and
   an electronic control unit secured to the shell portion, the electronic control unit being operably coupled to the tension sensor to receive the signal, the electronic control unit being capable of processing the signal to compare the signal to a signal indicative of a predetermined range of acceptable tension, wherein the electronic control unit provides an output indicating whether the tension of the adjustable harness tether is within the predetermined range, wherein the electronic control unit further comprises a display located on the shell portion.

2. The child seat as in claim 1, wherein the display is integrally formed with the shell portion and the output of the electronic control unit is an LED disposed on the display.

3. The child seat as in claim 1, wherein the display further comprises a liquid crystal display and the output of the electronic control unit is indicia disposed on the display.

4. The child seat as in claim 1, wherein the output is an audible annunciator if the tension of the adjustable harness tether is not within the predetermined range.

5. The child seat as in claim 1, wherein the output is audible text if the tension of the adjustable harness tether is not within the predetermined range.

6. The child seat as in claim 1, wherein the tension sensor is located at a point of securement between the adjustable harness tether and the child seat.

7. The child seat as in claim 6, wherein the tension sensor comprises at least one magnet and a Hall effect device positioned to detect the presence of a magnetic field of the at least one magnet.

8. The child seat as in claim 1, wherein the tension sensor is embedded into the adjustable harness tether.

9. The child seat as in claim 1, wherein the child seat is configured to restrain children having a weight less than approximately 22 pounds.

10. A child seat adapted for use in a vehicle, the child seat comprising:
    a shell portion;
    a harness for securing a child to the child seat, the harness comprising an adjustable harness tether secured to the shell portion at one end and having a latch plate at the other, the latch plate being configured to releasably engage a buckle of the harness;
    a buckle engagement sensor for providing a signal indicative of the latch plate being engaged by the buckle; and
    an electronic control unit secured to the shell portion, the electronic control unit being operably coupled to the buckle engagement sensor to receive the signal, the electronic control unit being capable of processing the signal to compare the signal to a signal indicative of the latch plate being engaged by the buckle, wherein the electronic control unit provides an output indicating whether the latch plate of the adjustable harness tether is engaged by the buckle, wherein the electronic control unit further comprises a display located on the shell portion.

11. The child seat as in claim 10, wherein the display is integrally formed with the shell portion and the output of the electronic control unit is an LED disposed on the display.

12. The child seat as in claim 10, wherein the display further comprises a liquid crystal display and the output of the electronic control unit is indicia disposed on the display.

13. The child seat as in claim 10, wherein the output is an audible annunciator if the latch plate of the adjustable harness tether is secured to the buckle.

14. The child seat as in claim 10, wherein the output is audible text if the latch plate of the adjustable harness tether is secured to the buckle.

15. The child seat as in claim 10, wherein the buckle engagement sensor is a microelectronic switch positioned within the buckle and the microelectronic switch is manipulated into a closed position when the latch plate is inserted within the buckle.

16. A child restraint system adapted for use in a vehicle, comprising:
    a child seat having a shell portion;
    a harness for securing a child to the child seat, the harness comprising a pair of adjustable shoulder harness tethers each being secured to the shell portion at one end and each having a latch plate configured to releasably engage a buckle secured to the shell by a buckle tether, the buckle tether being secured to the buckle at one end and the shell at another end;
    a first tension sensor for providing a first signal indicative of a tension in the pair of adjustable shoulder harness tethers; and an electronic control unit secured to the child seat, the electronic control unit being operably coupled to the first tension sensor to receive the first signal, the electronic control unit being capable of processing the first signal to compare the first signal to a signal indicative of a predetermined range of acceptable tension in the pair of adjustable shoulder harness tethers, wherein the electronic control unit provides a first output indicating whether the tension of the pair of adjustable shoulder harness tethers is within the predetermined range, wherein the electronic control unit further comprises a display located on the shell portion.

17. The child restraint system as in claim 16, further comprising a buckle engagement sensor for providing a second signal indicative of whether the latch plates of the pair of adjustable shoulder harness tethers are engaged by the buckle and the electronic control unit is also operably coupled to the buckle engagement sensor to receive the second signal, wherein the electronic control unit is capable of processing the second signal to compare the second signal to a signal indicative of the latch plates of the pair of adjustable shoulder harness tethers being engaged by the buckle, wherein the electronic control unit provides a second output indicating whether the latch plate of pair of adjustable shoulder harness tethers are engaged by the buckle.

18. The child restraint system as in claim 16, further comprising a second tension sensor for providing a second signal indicative of a tension in buckle tether, wherein the electronic control unit is also operably coupled to the second tension sensor to receive the second signal, the electronic control unit being capable of processing the second signal to compare the second signal to a signal indicative of a predetermined range of acceptable tension in the buckle tether, wherein the electronic control unit provides a second output indicating whether the tension of the buckle tether is within the predetermined range.

19. The child restraint system as in claim 18, further comprising a buckle engagement sensor for providing a third signal indicative of whether the latch plates of the pair of adjustable shoulder harness tethers are engaged by the buckle and the electronic control unit is also operably coupled to the buckle engagement sensor to receive the third signal, wherein the electronic control unit is capable of processing the third signal to compare the third signal to a signal indicative of the latch plates of the pair of adjustable shoulder harness tethers being engaged by the buckle, wherein the electronic control unit provides a third output indicating whether the latch plate of pair of adjustable shoulder harness tethers are engaged by the buckle.

20. The child restraint system as in claim 19, wherein the display is integrally formed with the shell portion and the first, second and third outputs of the electronic control unit are LEDs disposed on the display.

21. The child restraint system as in claim 20, wherein the electronic control is also operably coupled to a plurality of sensors each providing additional signals indicative of states of the child seat to the electronic control unit and the electronic control unit is capable of processing the additional signals to compare the additional signals to acceptable values, wherein the electronic control unit provides additional outputs indicating whether the additional signals are at acceptable values.

22. The child restraint system as in claim 21, wherein the plurality of additional sensors are selected from the group comprising: weight sensors, accelerometers and force sensors.

23. A method for determining if the tension of an adjustable harness tether configured to secure a child to the child seat is within an acceptable range, the method comprising:
locating a tension sensor along a portion of the adjustable harness tether, wherein the tension sensor is configured to provide a signal indicative of a tension of the adjustable harness tether;
receiving the signal of the tension sensor by an electronic control unit being operably coupled to the tension sensor and secured to a portion of the child seat;
processing the signal to determine if the signal corresponds to a predetermined range of acceptable tension; and
indicating whether the tension of the adjustable harness tether is within the predetermined range by providing an output, wherein the output is in the form of an illuminated display on a visible surface of the electronic control unit.

24. The method as in claim 23, wherein the signal is an analog signal.

25. A child seat adapted for use in a vehicle, the child seat comprising:
a base portion;
a carrier portion configured to restrain a child to the carrier portion being removable secured to the base portion;
a harness for securing a child to the carrier portion, the harness comprising a pair of adjustable shoulder harness tethers each being secured to the carrier portion at one end and each having a latch plate configured to releasably engage a buckle secured to the carrier by a buckle tether, the buckle tether being secured to the buckle at one end and the carrier at another end;
a first tension sensor for providing a first signal indicative of a tension in the pair of adjustable shoulder harness tethers;
an electronic control unit secured to the child seat, the electronic control unit being operably coupled to the first tension sensor to receive the first signal, the electronic control unit being capable of processing the first signal to compare the first signal to a signal indicative of a predetermined range of acceptable tension in the pair of adjustable shoulder harness tethers, wherein the electronic control unit provides a first output indicating whether the tension of the pair of adjustable shoulder harness tethers is within the predetermined range;
a second tension sensor for providing a second signal indicative of a tension in the buckle tether, wherein the electronic control unit is also operably coupled to the second tension sensor to receive the second signal, the electronic control unit being capable of processing the second signal to compare the second signal to a signal indicative of a predetermined range of acceptable tension in the buckle tether, wherein the electronic control unit provides a second output indicating whether the tension of the buckle tether is within the predetermined range; and
a buckle engagement sensor for providing a third signal indicative of whether the latch plates of the pair of adjustable shoulder harness tethers are engaged by the buckle and the electronic control unit is also operably coupled to the buckle engagement sensor to receive the third signal, wherein the electronic control unit is capable of processing the third signal to compare the third signal to a signal indicative of the latch plates of the pair of adjustable shoulder harness tethers being engaged by the buckle, wherein the electronic control unit provides a third output indicating whether the latch plate of pair of adjustable shoulder harness tethers are engaged by the buckle, wherein the electronic control unit further comprises a display located on the child seat.

26. The child seat as in claim 25, wherein display is integrally formed with the child seat and the first, second and third outputs of the electronic control unit are LEDs disposed on the display.

\* \* \* \* \*